June 10, 1930. C. F. NEWPHER 1,762,410
PROCESS OF MAKING BOLTS
Filed Sept. 19, 1927 2 Sheets-Sheet 1
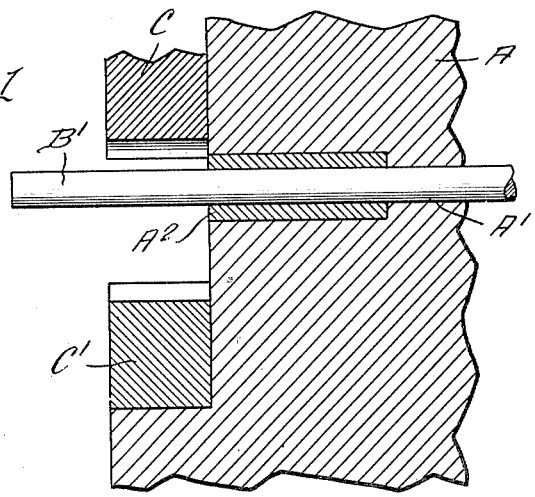
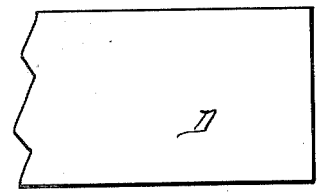
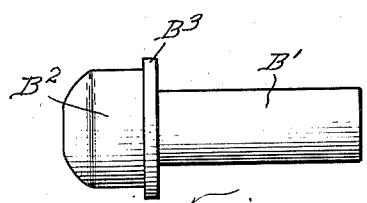
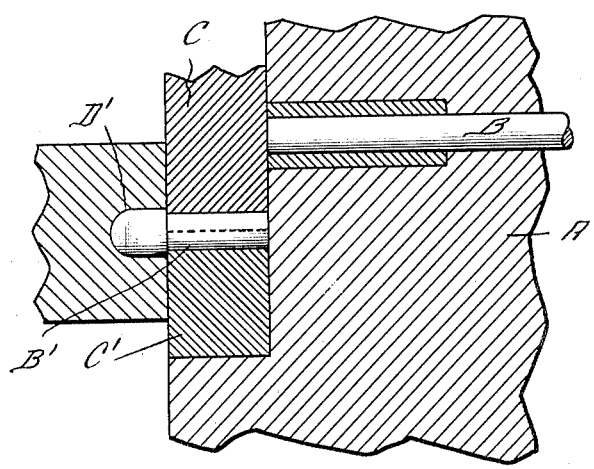
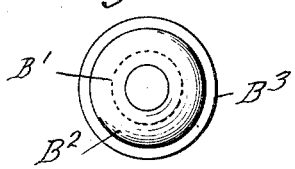
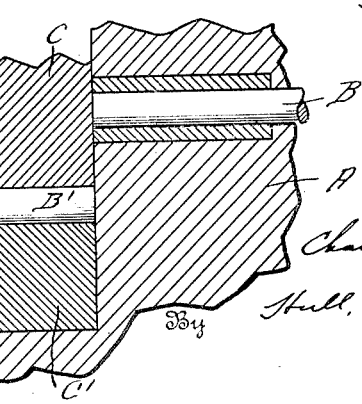

Patented June 10, 1930

1,762,410

UNITED STATES PATENT OFFICE

CHARLES F. NEWPHER, OF SHAKER HEIGHTS, OHIO, ASSIGNOR TO REPUBLIC STEEL CORPORATION, OF YOUNGSTOWN, OHIO, A CORPORATION OF NEW JERSEY

PROCESS OF MAKING BOLTS

Application filed September 19, 1927. Serial No. 220,345.

This invention relates to the art of making bolts each having a collar between the angular portion of the head and the shank. As bolts of this character have been formed heretofore, the "wire" has been fed intermittently through a guide; the portion of the wire projecting beyond such guide has been sheared by the movable block of a holding die and clamped between the fixed and movable die blocks with an end of the stock projecting; this projecting end of the stock has been subjected to heading operations, resulting in the production of a rounded or button head, with a collar at the base thereof; and this head has been given its angular shape by subjecting the same to a succession of milling operations.

The general purpose and object of this invention is to produce a bolt of this character in a more economical manner than has been contemplated heretofore and by a smaller number of operations.

Figure 6:
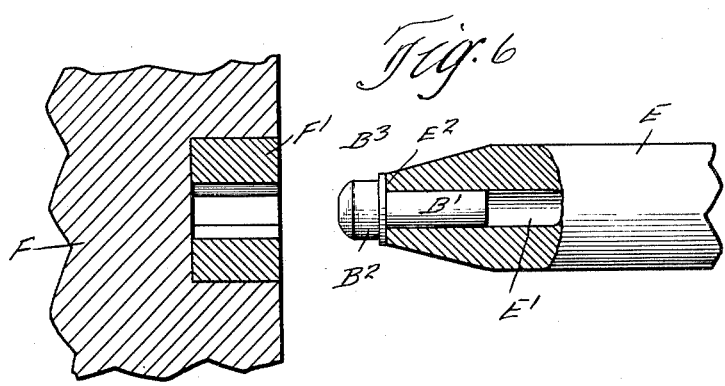
Figure 7:
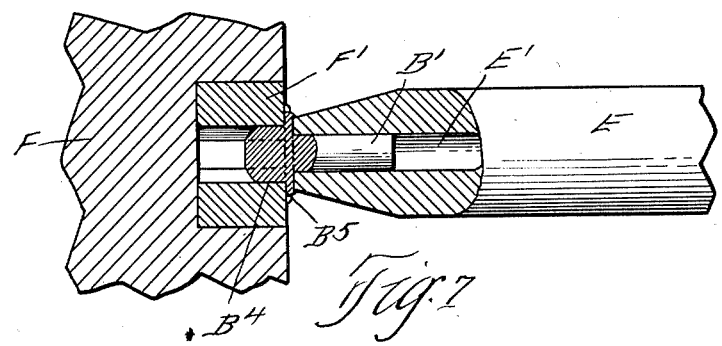
Figure 8:
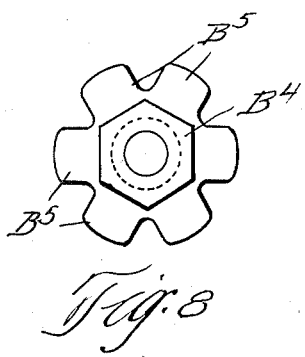
Figure 11:
Figure 9:
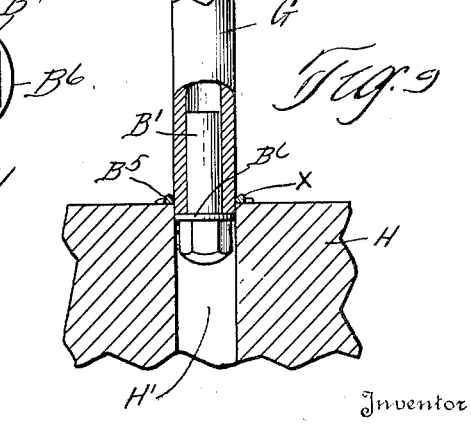
Figure 10:
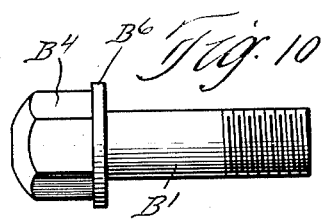

I accomplish this object in and through the process hereinafter described, in the realization of which I employ mechanism shown more or less diagrammatically in the drawings, wherein Fig. 1 represents a diagrammatic view, partly in section and partly in elevation, showing a portion of a forge-press bed, the movable and stationary holding die-blocks, and the heading die, the holding die-blocks being in open position; Fig. 2 a diagrammatic view, similar to Fig. 1, showing the holding die-blocks closed and the heading die block in section, during the first operation of the latter die; Fig. 3 a view, similar to Fig. 2, showing the heading die in its second position, forming a completed round or button head on the bolt blank; Fig. 4 a side elevation, and Fig. 5 an end view, of the bolt blank produced by the operations illustrated in Figs. 1–3 inclusive; Fig. 6 a view, similar to Figs. 2 and 3, of a shearing die and a movable carrier or punch for the bolt blank shown in Figs. 4 and 5; Fig. 7 a view, similar to Fig. 6, showing the shearing die operating upon the bolt head; Fig. 8 an end elevation of the bolt blank after having been subjected to the operation shown in Fig. 7; Fig. 9 a sectional view showing the manner of removing the flash from the bolt blank after the preceding operations; and Fig. 10 a side elevation, and Fig. 11 an end elevation, of the completed bolt.

Describing the mechanism by reference to the drawings, A represents a portion of the bed of a forging press, the said bed being provided with a bore A' constituting a guide for the wire B, from which the bolts are to be formed, the delivery portion of the bore A' being provided with a bushing $A^2$ of hardened steel. The wire B is fed automatically and intermittently, in the usual manner, along the bore A' so that a portion B' will project beyond, the length of the projecting portion B' being determined by the desired length of the finished bolt. The projecting portion B' of the wire extends between the movable block C and the fixed block C' of a holding die, the fixed block C' being located at one side of the bushing $A^2$ whereby, on moving the block C toward the block C', the portion B' of the wire will be sheared by the former block as well as being gripped between the blocks C, C' in the manner shown in Fig. 2.

After the projecting portion B' of the wire has been so sheared, and gripped between the blocks C and C', the end of the wire B' which projects beyond these die blocks is subjected to two successive heading operations by the heading die D, this die being provided with a pair of heading cavities D' and $D^2$, shown respectively in Figs. 2 and 3, and by means of which a rounded or button-shaped head $B^2$ is given to the bolt blank, with the provision of a collar $B^3$ at the base of said button head, the said collar being due to the accumulation of metal where the dies D and C, C' substantially contact.

As stated hereinbefore it has been customary, after having formed the head $B^2$, $B^3$ in this manner to subject the rounded portion $B^2$ of the head to a succession of milling operations thereby to impart to the button head $B^2$ the usual angular form. In order to minimize the number of operations and to reduce the cost of production, I give the desired angular form to the bolt head in the manner shown in Figs. 6, 7 and 9.

The shank B' of the incomplete bolt or bolt blank is inserted within the bore E' of a movable punch or carrier E, the operating end of this punch providing an annular seat E² for the collar B³. By this carrier or punch, the bolt blank is moved toward a block F having a shearing die F' therein shaped to give the desired angular shape to the rounded head B² at a single operation. While this die is shown as so shaped as to give a hexagonal shape to the head, for the purposes of my invention it is immaterial what may be the number of sides of the head. The punch or carrier E thrusts the projecting head B² into the die F', which die gives to the head the angular shape shown at B⁴, in Figs. 9–11 inclusive. The stroke of the punch or carrier is such that the shearing movement is arrested when the adjacent portions of the punch or carrier and of the die F' are spaced apart a distance substantially equal to the thickness of the collar B³. This operation leaves a thickness of stock at the base of the head sufficient for a collar, the excess stock due to the shearing action producing a flash B⁵ at the base of the head B⁴, which flash is shown in Figs. 7 and 8 and which includes therein and is merged with the collar B³. This flash is reduced to the desired size and shape by mounting the shank B' of the bolt blank in another punch or carrier G, setting the flash against the operating end of said punch or carrier and then moving the punch or carrier into a cylindrical cavity H' in a trimming die H, it being noted that the diameter of the operating end of the punch or carrier G is the desired diameter of the final collar B⁶ on the bolt head. This operation results in trimming off the surplus flash metal, as indicated at X on Fig. 9, leaving the collar B⁶, as indicated. It will probably be desirable to smooth off or finish the collar B⁵, and this operation can be done at the same time as the usual smoothing or finishing operation is performed upon the head B⁴ and particularly upon the rounded end B⁶ of such head.

By virtue of the process described herein, I am enabled to produce headed bolts of the character shown and described herein at a material saving of time and expense as compared with their production by the methods now in vogue.

Having thus described my invention, what I claim is:—

1. The method of making bolts comprising forming a button head on the stock, with a collar at the base thereof, then shaping the head and simultaneously forming a flash at its base with a portion of which the collar is merged, and then trimming the portion of the flash which projects beyond the confines of the collar, thereby to restore the collar.

2. The method of making bolts comprising upsetting the end of a piece of stock to form a button head and collar thereon, then shaping said head with axial pressure and simultaneously forming a flash with a portion of which the collar is merged, and then trimming the portion of the flash which projects beyond the confines of the collar, thereby to restore the collar.

In testimony whereof, I hereunto affix my signature.

CHARLES F. NEWPHER.